United States Patent Office 3,536,724
Patented Oct. 27, 1970

3,536,724
CASSENIC AND ISOCASSENIC ACID ESTERS
Artur Rüegger, Bottmingen, Dietrich Stauffacher, Reinach, Basel-Land, and Hartmut Hauth, Riehen, Switzerland, assignors to Sandoz Ltd. (also known as Sandoz AG), Basel, Switzerland
No Drawing. Filed June 24, 1968, Ser. No. 739,164
Claims priority, application Switzerland, June 26, 1967, 9,048/67; June 28, 1967, 9,213/67; Apr. 24, 1968, 6,104/68, 6,105/68
Int. Cl. C07d 29/30
U.S. Cl. 260—294.3                                   10 Claims

ABSTRACT OF THE DISCLOSURE 3-acetylamino-14-desmethyl-cassenic and -isocassenic acid β-dimethylamino-ethyl esters, e.g. 3-(N-piperidino-acetylamino) - 14 - desmethyl-cassenic acid β-dimethylamino-ethyl ester, which are useful as cardiotonic agents with a positive inotropic effect, are prepared by reacting a reactive functional derivative of an appropriate acid with 3-amino-14-desmethyl-cassenic or -isocassenic acid β-dimethylamino-ethyl ester.

---

The present invention relates to new alicyclic compounds and to their production.

The present invention provides compounds of Formula Ia,

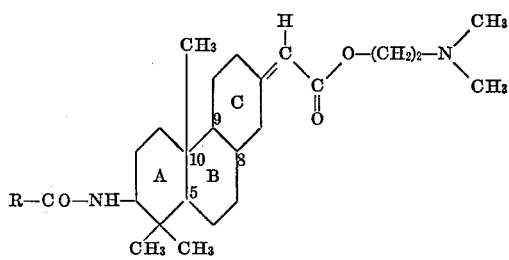

and the corresponding compounds of Formula Ib,

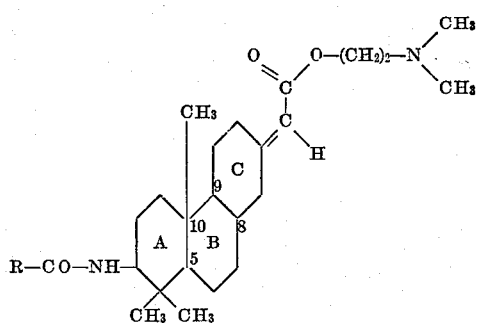

in which Formulae R signifies a piperidino-methyl, piperidino-ethyl or D-glucopentahydroxy-pentyl radical, and their acid addition salts.

In Formulae Ia, Ib and in the following formulae the rings A, B and C are joined together by a trans linkage, i.e. the methyl radical in the 10 position is in a trans position to the hydrogen atom in the 5 position, and the two hydrogen atoms in the positions 8 and 9 are in a trans position to each other; the hydrogen atom in the 9 position is also in a trans position to the methyl radical in the 10 position. Furthermore the substituent in the 3 position is in the equatorial position.

The present invention also provides a process for the production of compounds of general Formulae Ia and Ib and their acid addition salts, characterized in that a compound of general Formula IIa,

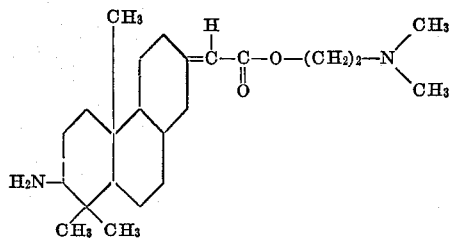

or the corresponding compound of general Formula IIb,

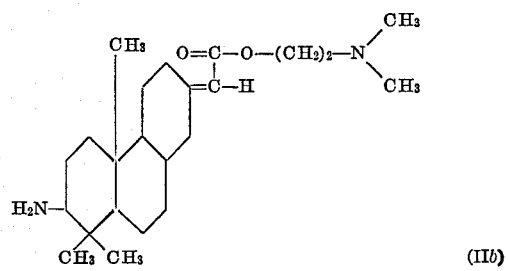

is reacted with a reactive functional derivative of an acid of general Formula III, $$R\text{—}COOH \qquad (III)$$

in which R has the above significance.

Suitable reactive functional derivatives include acid azides and anhydrides, and the reaction product of the acid with dicyclohexylcarbodiimide.

In a preferred embodiment of the process a compound of general Formula IIa or IIb is reacted in an inert solvent with a mixed anhydride of an acid of general Formula III', $$R'\text{—}COOH \qquad (III')$$

in which R' signifies the piperidino-methyl or the piperidino-ethyl radical, and benzoic acid, with the addition of a dilute solution of caustic soda. The condensation product is subsequently isolated and purified by conventional means, e.g. by crystallization, reprecipitation or chromatography.

In another preferred embodiment of the process, a compound of general Formula IIa or IIb is reacted with D-gluconic acid lactone while heating and in the absence of moisture. The resulting reaction product is subsequently purified, e.g. by distribution methods, preferably by distribution chromatography.

The compounds of general Formulae Ia and Ib, which are obtained in the form of their racemates, may be converted into acid addition salts which are crystalline at room temperature by reacting with a suitable organic or inorganic acid. Suitable acids include organic acids, such as fumaric, maleic, tartaric and methanesulphonic acid, or inorganic acids, such as hydrochloric, hydrobromic and sulphuric acid.

The production of the compounds of Formulae Ia and Ib according to the invention involves the use of the following hitherto unknown starting compounds:

7-formamido - 4b,8,8 - trimethyl-1,4,4a,4b,5,6,7,8,8a,9,10,-10a-dodecahydro-2(3H)-phenanthrone of Formula IX,

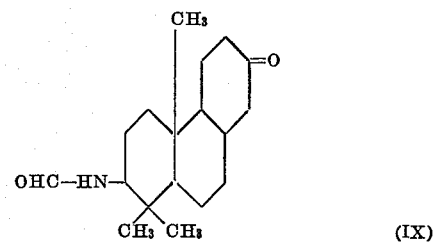

3-amino-14-desmethyl-isocassenic acid β-dimethylamino-
ethyl ester of Formula IIa, 3 - amino-14-desmethyl-cassenic acid β - dimethylamino-
ethyl ester of Formula IIb, and the hydrohalides of the mixed anhydrides from an acid of general Formula III′, in which R′ has the above significance, and from benzoic acid.

The above compounds, and their preparation, also form part of the present invention. Processes for the preparation of the compounds are set out below, further details being given in the specific examples.

(1) 7-formamido-4b,8,8-trimethyl-1,4,4a,4b,5,6,7,8,8a,9,-10,10a-dodecahydro-2(3H)-phenanthrone (Formula IX)

(a) 7-methoxy-1,1,4a-trimethyl-3,4,4a,9,10,10a-hexahydro-2(1H)-phenanthrone of Formula IV,

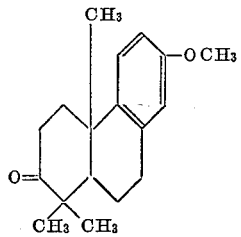

(IV)

is reacted with hydroxylamine to give 7-methoxy-1,1,4a-trimethyl - 3,4,4a,9,10,10a - hexahydro - 2(1H) - phenanthrone-oxime of Formula V,

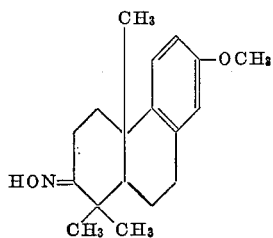

(V)

this is reduced with lithium and alcohol in liquid ammonia, whereby the aromatic ring is partially hydrogenated and the oximino radical is reduced to the amino radical, yielding 2-amino-7-methoxy-1,1,4a-trimethyl - 1,2,3,4,4a-5,8,9,10,10a-decahydro-phenanthrene of Formula VI,

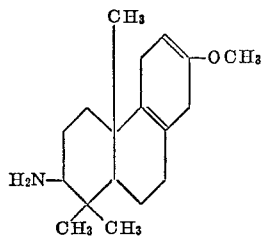

(VI)

which is conveniently separated as acetate. The compound of Formula VI, suitably as its acetate, is dissolved at room temperature in a strong alcoholic-aqueous acid, preferably containing about 10% of water, whereby the enol ether radical is split and 7-amino-4b,8,8-trimethyl-4,4a,4b,5,6,7,8,8a,9,10-decahydro-2(3H)-phenanthrone of Formula VII, Y⁻=anionic
acid radical

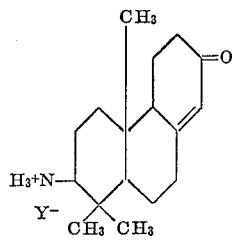

(VII)

is obtained in the form of its salt. This is formylated in pyridine solution, preferably with the addition of a tertiary base, e.g. triethylamine, with the mixed anhydride from acetic acid and formic acid, to give 7-formamido-4b,8,8 - trimethyl - 4,4a,4b,5,6,7,8,8a,9,10 - decahydro-2(3H)-phenanthrone of Formula VIII,

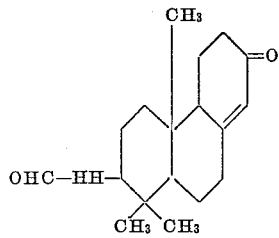

(VIII)

and this is hydrogenated with lithium in liquid ammonia to give 7-formamido-4b,8,8-trimethyl-1,4,4a,4b,5,6,7,8,8a,9,10,10a-dodecahydro-2(3H)-phenanthrone of Formula IX.

(b) 4b,8,8-trimethyl-perhydro-phenanthrene-2,7 - dione of Formula X,

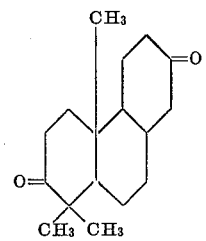

(X)

is treated with ethylene glycol in an anhydrous medium in the presence of an acid catalyst to give 2,2-ethylenedioxy-4b,8,8 - trimethyl - perhydro - phenanthrone - (7) of Formula XI,

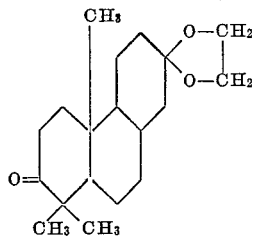

(XI)

this is reacted with hydroxylamine at room temperature or at an elevated temperature, the resulting 2,2-ethylenedioxy-4b,8,8-trimethyl-perhydro-phenanthrone - (7) - oxime of Formula XII,

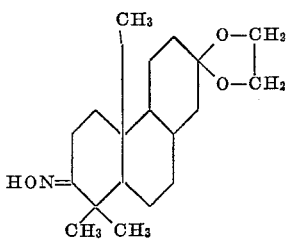

(XII)

is reduced with lithium and ethanol in liquid ammonia, the resulting 7-amino-2,2-ethylenedioxy-4b,8,8-trimethyl-perhydro-phenanthrene of Formula XIII,

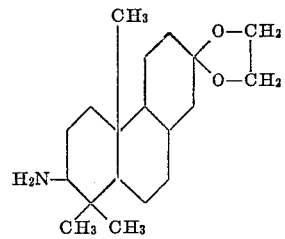

(XIII)

is subsequently converted without isolation, in pyridine solution, with the mixed anhydride from acetic acid and formic acid, into 7-formamido-2,2-ethylenedioxy-4b,8,8-trimethyl-perhydro-phenanthrene of Formula XIV,

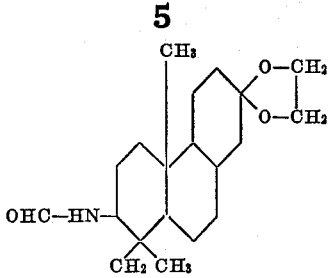

(XIV)

and this is subsequently reacted with a mineral acid to give 7 - formamido-4b,8,8-trimethyl-1,4,4a,4b,5,6,7,8,8a,9,10,10a-dodecahydro-2(3H)-phenanthrone of Formula IX.

(2) 3-amino-14-desmethyl-isocassenic acid β-dimethylamino-ethyl ester (Formula IIa) and 3-amino-14-desmethyl-cassenic acid β-dimethylamino-ethyl ester (Formula IIb)

7-formamido - 4b,8,8 - trimethyl-1,4,4a,4b,5,6,7,8,8a,9,10,10a-dodecahydro-2(3H)-phenanthrone is reacted with O,O-dialkyl-phosphono-acetic acid ester to give a mixture of rac. 3-formamido-14-desmethyl-cassenic acid ethyl ester of Formula XVb,

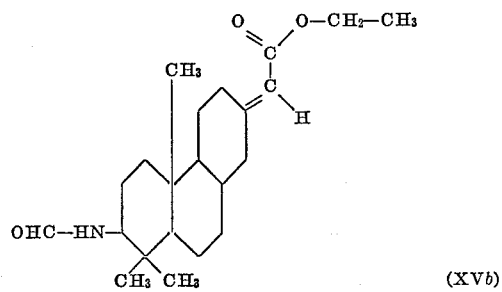

(XVb)

and rac. 3-formamido-14-desmethyl-isocassenic acid ethylester of Formula XVa.

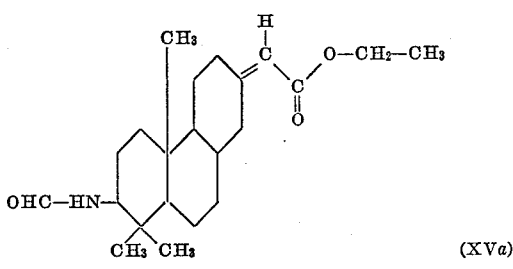

(XVa)

The formyl radical is split off from this by heating, e.g. boiling for 7 hours, in a mixture of a mineral acid and a lower secondary alcohol or ethanol, whereby rac. 3-amino-14-desmethyl-cassenic acid ethyl ester of Formula XVIb,

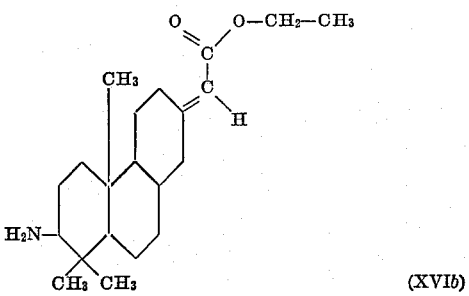

(XVIb)

and rac. 3-amino-14-desmethyl-isocassenic acid ethyl ester of Formula XVIa,

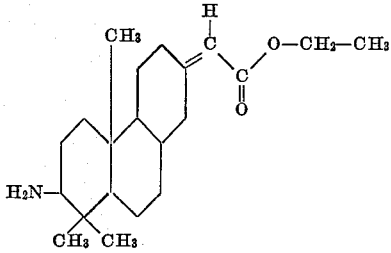

(XVIa)

are formed. These are converted with 2-(dimethylamino)-ethanol in the presence of an alkaline metal hydroxide (e.g. potassium hydroxide) into rac. 3-amino-14-desmethyl-cassenic acid β-dimethylamino-ethyl ester of Formula IIb and rac. 3-amino-14-desmethyl-isocassenic acid β-dimethylamino-ethyl ester of Formula IIa, and this mixture is subsequently separated into the seqcis and seqtrans form, i.e. into the above two derivatives of isocassenic and cassenic acid, by chromatography or fractional crystallization of its salts.

(3) Mixed anhydrides

The process for the production of mixed anhydrides from acids of general Formula III', in which R' signifies the piperidino-methyl or the piperidino-ethyl radical, and benzoic acid in the form of their hydrohalides, consists in that an acid of general Formula III', in which R' has the above significance, in a suitable inert solvent, preferably acetonitrile, is reacted with a benzoyl halide, preferably, benzoyl chloride, and the hydrohalide of the anhydride which crystallizes is separated.

The compounds of Formulae Ia and Ib are useful because they possess pharmacological activity in animals. In particular, the compounds possess cardiac activity and may be used as cardiotonic agents with a positive inotropic effect as indicated by their positive inotropic effect in the isolated perfused heart test [H. Emmenegger et al., Helv. Physiol. Acta 20, 213–226 (1962)] in the cat.

For such use, the compounds may be combined in conventional manner with a pharmaceutically acceptable carrier, and such other adjuvants as may be desirable, for oral administration in the form of a tablet, dragée, syrup or the like or for intramuscular injection in the form of an injectable solution or suspension. Furthermore, the compounds may similarly be administered in the form of their pharmaceutically acceptable acid addition salts, which possess the same order of activity as the free base.

Examples of suitable carriers are:

for tablets and dragées: lactose, starch, talc and stearic acid;

for syrups: solutions of cane sugar, invert sugar and glucose;

for injectable solutions: water, alcohols, glycerin and vegetable oils.

The preparations may furthermore contain suitable preserving, stabilizing and wetting agents, solubilizers, sweetening and coloring substances and flavorings.

For the above-mentioned use, the dosage administered will, of course, vary depending on the compound employed, the mode of administration and the treatment desired. However, in general satisfactory results are obtained when the compounds are administered by intramuscular injection at a daily dosage of from about 0.005 to about 0.1 milligram per kilogram of animal body weight, preferably given in divided doses 2 to 3 times a day. For most mammals the total daily dosage is generally in the range of from about 0.35 to about 7 milligrams and dosage forms suitable for administration orally or by intramuscular injection comprise about 0.12 to about 3.5 milligrams of the compound admixed with a solid or liquid pharmaceutical carrier or diluent.

In the following non-limitative examples, all temperatures are indicated in degrees centigrade. The melting points are corrected.

Unless other indications are given, the UV spectra were taken in ethanol. the IR spectra in Nujol, the NMR spectra with $CDCl_3$ as solvent. The position of the signals is indicated in δ(p.p.m.), tetramethylsilane ($δ_{TMS}=0$) being used as reference substance. The numbers of hydrogen atoms indicated in the NMR data were ascertained by electronic integration.

Thin layer chromatography was effected on silica gel G layer. Chloroform/methanol was used as eluant. The spots were made visible by vaporizing with iodine and/or by spraying with $KMnO_4$ solution, or, in the case of the basic compounds, with Dragendorff's reagent.

EXAMPLE 1

Racemic 3-(N-piperidino-acetylamino)-14-desmethyl-cassenic acid β-dimethylamino-ethyl ester 470 mg. of racemic 3-amino-14-desmethyl-cassenic acid-β-dimethylamino-ethyl ester (seqtrans-form) dimethane sulphonate are added to 20 cc. of a 0.4 N solution of caustic soda, 25 cc. of peroxide-free ether and 454 mg. of the hydrochloride of the mixed anhydride from N-piperidino-acetic acid and benzoic acid are added and the mixture is subsequently shaken for 30 minutes while cooling internally and externally with ice. The ether solution is subsequently separated, dried and concentrated by evaporation. The residue is recrystallized from hexane, whereby racemic 3-(N-piperidino-acetylamino)-14-desmethyl-cassenic acid-β-dimethylamino-ethyl ester (seqtrans-form) precipitates. Melting point 83 to 85°.

Conversion into the dimethane sulphonate is effected by dissolving 204 mg. of the base in 2 cc. of isopropanol and adding a little more than the calculated amount of methane sulphonic acid dissolved in isopropanol. The crystalline salt starts to precipitate at −10°; its precipitation is completed by the addition of tetrahydrofuran. After filtering with suction and drying in a high vacuum the compound has an indefinite melting point of 165°.

EXAMPLE 2

Racemic 3 - (N - piperidino-acetylamino)-14-desmethyl-isocassenic acid β-dimethylamino-ethyl ester 569 mg. of racemic 3 amino-14-desmethyl-isocassenic acid-β-dimethylamino-ethyl ester (seqcis-form) dimethane sulphonate in 25 cc. of a 0.4 N caustic soda solution and 30 cc. of peroxide-free ether are treated in manner analogous to that described in Example 1 with 567 mg. of the hydrochloride of the mixed anhydride from N-piperidino acetic acid and benzoic acid. After recrystallization from hexane the crude product (ether residue) yields racemic 3 - (N - piperidino-acetylamino)-14-desmethyl-isocassenic acid-β-dimethylamino-ethyl ester (seqcis-form) having a melting point of 117.5 to 118.5°; a second fraction has a melting point of 114 to 115.5°.

The dimethane sulphonate slowly crystallizes at −10° from the solutions of the components in isopropanol (7 cc.). Melting point 192.5 to 198° (after drying in a high vacuum).

EXAMPLE 3

Racemic 3-(β-N-piperidino-propionylamino)-14-desmethyl-isocassenic acid β-dimethylamino-ethyl ester 580 mg. of racemic 3-amino-14-desmethyl-isocassenic acid-β-dimethyl-amino-ethyl ester(seqcis-form) dimethane sulphonate in 25 cc. of 0.4 N solution of caustic soda and 30 cc. of peroxide-free ether, are treated in a manner analogous to that described in Example 2 with 600 mg. of the hydrochloride of the mixed anhydride form β-N-piperidino-propionic acid and benzoic acid (after the reaction is completed methylene chloride is added for a better separation of the phases). The crude product (evaporation residue of the ether-methylene chloride solution) is recrystallized from isopropyl ether, whereby racemic 3-(β-N-piperidino-propionylamino)-14-desmethyl-isocassenic acid-β-dimethylamino-ethyl ester (seqcis-form) having a melting point of 149.5 to 150.5°, is obtained.

The dimethane sulphonate crystallizes from the solution of the components in isopropanol after the addition of tetrahydrofuran. Melting point 192.5 to 194.5°.

EXAMPLE 4

Racemic 3 - β - N - piperidino-propionylamino)-14-desmethyl-cassenic acid β-dimethylamino-ethyl ester Racemic 3 - (β - N - piperidino-propionylamino)-14-desmethyl-cassenic acid-β-dimethylamino-ethyl ester (seqtrans-form), having a melting point of 123 to 134°, is obtained in a manner analogous to that described in Example 3 after recrystallization of the crude product from isopropylether.

The dimethane sulphonate crystallizes from the solution of the components in isopropanol after the addition of dioxane. Melting point 176 to 177.5°.

EXAMPLE 5

Racemic 3 - D - gluconylamino-14-desmethyl-cassenic acid β-dimethylamino-ethyl ester 428 mg. of racemic 3-amino-14-desmethyl-cassenic acid - β - dimethylamino-ethyl ester (seqtrans-form) are stirred to a paste with 253 mg. of D-gluconic acid lactone, whereupon this paste is heated to 125° by bath temperature for 50 minutes in a vacuum and in the absence of moisture. The reaction mixture is chromatographed on 160 g. of silica gel to which 190 cc. of water have been added, whereby a mixture of 92% of ethyl acetate and 8% of isopropanol, which has been shaken with aqueous 1 N ammonia, is used as eluant. The 40 cc. eluate fractions are examined by thin layer chromatography to determine their composition. Thin layer chromatography is effected on silica gel layers using a mixture of chloroform and methanol (8:2) as ascending liquid, the plates having an atmosphere of ammonia. The fractions 7–10 contain the uniform racemic 3-D-gluconyl-amino-14-desmethyl-cassenic acid-β-dimethylamino-ethyl ester (seqtrans-form) (thin layer chromatographic picture after spraying with Dragendorff's reagent: elongated, orange-coloured spots near the starting point); fractions 11–13 contain the same compound mixed with others (the mixture is again chromatographed in analogous manner whereupon on a further amount of the uniform compound is obtained).

Uniform racemic 3 - D - gluconylamino-14-desmethyl-cassenic acid-β-dimethylamino-ethyl ester (seqtrans-form) is converted into its hydrogen oxalate, by dissolving it in 10 cc. of water in which the calculated amount of oxalic acid has been dissolved, filtering off the material causing a slight turbidity in the solution, concentrating by evaporation after the addition of alcohol and drying the residue in a high vacuum. The residue has a melting point of 178 to 180° (decomp., after softening at 170°).

EXAMPLE 6

Racemic 3 - D - gluconylamino-14-desmethyl-isocassenic acid β-dimethylamino-ethyl ester 420 mg. of racemic 3-amino-14-desmethyl-isocassenic acid - β - dimethyl-amino-ethyl ester (seqcis-form) are stirred to a paste with 250 cc. of D-gluconic acid lactone and this paste is kept at 125° (bath temperature) for 60 minutes in a vacuum and in the absence of moisture. The reaction mixture is subsequently chromatographed on water-containing silica gel in a manner analogous to that described in Example 5. The fractions showing a uniform, elongated spot near the starting point in the thin layer chromatogramme are combined and the mixed fractions are again chromatographed in analogous manner whereby racemic 3-D-gluconyl-amino-14-desmethyl-isocassenic acid-β-dimethylaminoethyl ester (seqcis-form) is obtained. This is converted into its hydrogen oxalate in a manner analogous to that described in Example 5. Melting point 175 to 178.5° (after softening).

PRODUCTION OF THE INTERMEDIATES (1) 7 - formamido - 4b,8,8-trimethyl-1,4,4a,4b,5,6,7,8,8a, 9,10,10a-dodecahydro-2(3H)-phenanthrone (a) 7 - methoxy - 1,1,4a - trimethyl-3,4,4a,9,10,10a-hexahydro-2(1H)-phenanthrone-oxim.—21.6 g. of hydroxylamine hydrochloride and 27 g. of potassium acetate are boiled in 1.1 litres of methanol for 10 minutes, 27 g. of 7 - methoxy - 1,1,4a - trimethyl-3,4,4a,9,10,10a-hexahydro-2(1H)-phenanthrone are subsequently added, boiling is continued for 1 hour whereupon 1.5 litres of water are added, most of the methanol is distilled off and the solid precipitate is filtered with suction, washed and dried. After recrystallization from ethanol 7-methoxy-1,1,4a-trimethyl-3,4,4a,9,10,10a-hexahydro-2(1H) - phenanthroneoxim, having a melting point of 186.5 to 187.5°, is obtained.

(b) 2 - amino-7-methoxy-1,1,4a-trimethyl-1,2,3,4,4a,5, 8,9,10,10a-decahydro-phenanthrene.—22 g. of 7-methoxy-1,1,4a - trimethyl - 3,4,4a,9,10,10a - hexahydro - 2(1H)-phenanthrone-oxim are dissolved in 360 cc. of dry tetrahydrofuran and the solution is added dropwise to 2.4 litres of liquid ammonia which are cooled with solid carbon dioxide in acetone. Stirring is continued for 20 minutes and 32.8 g. of lithium in small pieces are then added during the course of 30 minutes. After stirring for a further 30 minutes, 960 cc. of absolute alcohol are added dropwise during the course of 1½ hours and stirring is again effected for 20 minutes, whereupon the cooling bath is removed, the still dark blue mixture is further stirred until decolouration occurs and ice and water are added to the mixture obtained after evaporation of the ammonia. After distilling off the alcohol the aqueous mixture is extracted with methylene chloride and the dried methylene chloride solution is concentrated by evaporation. The residue is dissolved in 500 cc. of tetrahydrofuran and 5 cc. of glacial acetic acid are added, whereupon the crystalline acetate of the base commences to precipitate almost immediately. After allowing to stand in the cold the precipitation of the pure salt is practically completed: 2 - amino-7-methoxy-1,1,4a-trimethyl-1,2,3,4, 4a,5,8,9,10,10a - decahydro-phenanthrene acetate has a melting point of 191.5 to 193°.

The base liberated from a sample of the acetate has a melting point of 125 to 126° after recrystallisation from isopropylether.

The N.M.R.-spectrum of the base has the following characteristics: Wide strongly split up signal with chief maximum at 2.30 p.p.m. for the individual H at C-2; singlet at 2.73 p.p.m. for the 4H of both methyl groups between the double bonds of the unsaturated ring C; singlet for the 3 protons of the O-methyl group at 3.52 p.p.m.; singlet for the H at C-6 (—CH=C—OCH$_3$) at 4.70 p.p.m.

(c) 7-amino - 4b,8,8-trimethyl-4,4a,4b,5,6,7,8,8a,9,10-decahydro-2(3H)-phenanthrone hydrochloride.—78.5 g. of 2 - amino-7-methoxy-1,1,4a-trimethyl-1,2,3,4,4a,5,8,9, 10,10a-decahydro-phenanthrene acetate are shaken in a mixture of 470 cc. of a 2.5 N solution of hydrochloric acid in alcohol and 47 cc. of water whereby the material dissolves rapidly. The mixture is subsequently allowed to stand at room temperature for 15 minutes, whereupon 7-amino-4b,8,8-trimethyl - 4,4a,4b,5,6,7,8,8a,9,10 - decahydro-2(3H) - phenanthrone hydrochloride slowly commences to crystallize. After allowing the mixture to stand overnight at —10°, the salt is filtered with suction and dried (decomp. from 350° after sintering).

IR-spectrum: inter alia bands at 1650 cm.$^{-1}$ for $\alpha,\beta$-unsaturated ketone. N.M.R.-spectrum: no methoxy group protons. Singlet at 0.64 p.p.m. for protons of methyl at C-4$b$; singlets for the protons of the methyl group at C-8 at 1.22 and 1.45 p.p.m.; wide signal from 3.16 to 3.55 p.p.m. with 4 peaks for the protons at C-7; singlet at 6.03 p.p.m. for single proton at C-1 (evidence of double bond in $\alpha,\beta$-position to the carbonyl group); very flat elevation for the three ammonium protons from about 7.0 to 9.0 p.p.m.

(d) 7-formamido - 4b,8,8 - trimethyl-4,4a,4b,5,6,7,8, 8a,9,10 - decahydro-2(3H)-phenanthrone.—The formylation mixture obtained by heating 27 cc. of formic acid with 24.5 cc. of acetic anhydride to 50° for 2 hours, is added dropwise within 30 minutes to a solution stirred and cooled with ice water of 19 g. of 7-amino-4b,8,8-trimethyl - 4,4a,4b,5,6,7,8a,9,10 - decahydro - 2(3H)-phenanthanthrone hydrochloride in an anhydrous mixture of 300 cc. of pyridine and 30 cc. of triethylamine and the mixture is allowed to stand at room temperature for 20 hours. After adding a small amount of water, filtering the precipitate with suction an concentrating the pyridine in solution, 1.2 litres of water with ice are added and the precipitate which has been filtered with suction and washed thoroughly with water is dried under calcium chloride first under the usual vacuum and finally in a high vacuum. The crude product is recrystallized from a mixture of 150 cc. of benzene and 45 cc. of hexane, whereby 7 - formamido-4b,8,8-trimethyl-4,4a,4b,5,6,7,8, 8a,9,10-decahydro-2(3H)-phenanthrone having a melting point of 142 to 143.5°, is obtained. The residue of the concentrated mother liquor is chromatographed on 600 g. of aluminum oxide of activity III with benzene +0.6% of methanol as eluant and the combined fractions which are uniform in accordance with the thin layer chromatogramme are recrystallized from benzene-hexane whereby a further amount of the formyl derivative mentioned above (melting point 141 to 143°) is obtained.

IR-spectrum; inter alia bands at 1648 cm.$^{-1}$ for $\alpha,\beta$-unsaturated ketone; 3240 cm.$^{-1}$ for —NH— of the amide group.

N.M.R.-spectrum: inter alia wide slightly split up signal of the proton at C-7 from 3.57 to 4.15 p.p.m.; singlet at 5.92 p.p.m. for proton at double bond in $\alpha$-position to the keto group; signals for each proton at N and C of the formamido group at 6.17 or 8.28 p.p.m.

(e) 7 - formamido-4b,8,8-trimethyl - 1,4,4a,4b,5,6,7,8, 8a, 9,10,10a-dodecahydro-2(3H)-phenanthrone.—5.1 g. of lithium (small wire pieces) are added to 1.16 litres of liquid ammonia which have been stirred and cooled with solid carbon dioxide in acetone. After stirring for a further 30 minutes a solution of 14.03 g. of unsaturated 7-formamido - 4b,8,8 - trimethyl - 4,4a,4b,5,6,7,8,8a,9,10-decahydro-2-(3H)-phenanthrone in 320 cc. of tetrahydrofuran is added dropwise to the mixture and after stirring for a further 1½ hours 50 g. of ammonium chloride are added, whereupon the initially dark blue solution decolourizes. After the ammonia has evaporated ice and water are added to the residue and the mixture is shaken with methylene chloride. The residue of the methylene chloride solution which has been concentrated by evaporation no longer indicates starting material in the thin layer chromatogramme (silica gel plates, chloroform with 4% of methanol as eluant, potassium permanganate solution for revealing: light spots on a red background, which become more distinct by heating), but shows a by-product with R 0.58 aside from 7-formamido-4b,8,8-trimethyl - 1,4,4a,4b,5,6,7,8,8a,9,10,10a - dodecahydro - 2(3H)-phenanthrone (RF=0.52).

The indicated residue is chromatographed with 2 kg. of aluminum oxide of activity III; 25 fractions of 1 litre each of benzene with 0.4% of methanol as eluant. Fractions 12 to 16 contain 7-formamido-4b,8,8-trimethyl-1,4,4a,5,-6,7,8,8a,9,10,10 - dodecahydro - 2(3H)-penanthrone having an RF of 0.52 with trace 0.58; fractions 17 to 25 contain a mixture of RF 0.52+0.58. A considerable part of the crude product is not eluted and therefore consists of a further by-product. All the fractions which contain at most a trace of the by-product are then jointly recrystallized from benzene-hexane (3:1) whereby 7-formamido-4b,8,8-trimethyl-1,4,4a,5,6,7,8,8a,9,10,10a -dodecahydro-2(3H)-phenanthrone, having a melting point of 155.5 to 158.5° is obtained. The mixed fractions are combined and are chromatographed a second time in analogous manner whereby after recrystallizing the practically uniform fractions from benzene-hexane a further amount of 7-formamido-4b,8,8-trimethyl-1,4,4a,4b,5,6,7,8,8a,9,10,10a-dodecahydro-2(3H)-phenanthrone, having a melting point of 155.5 to 158°, is obtained.

A sample of the compound recrystallized once more from methylethylketone has a melting point of 157.5 to 158.50.

IR-spectrum: Especially bands at 1713 cm.$^{-1}$ for saturated ketone.

NMR-spectrum: inter alia signals with peaks at 2.22 and 2.37 p.p.m. for 4 protons in α-position to the carbonyl group (evidence of the disappearance of the double bond); very wide, little split up signal from 3.5 to 4.1 p.p.m. for axial H at C-7; wide signal from 5.35 to 5.92 p.p.m.; singlet at 8.20 p.p.m. for the N—H— or the O=C—H—proton of the formamido group.

(2) 7-formamido-4b,8,8-trimethyl - 1,4,4a,4b,5,6,7,8,8a,9,10,10a-dodecahydro-2(3H)-phenanthrone (a) 4b,8,8-trimethyl-perhydro-phenanthrene-2,7-dione.—14.8 g. (2.13 mols) of lithium are added portionwise to 4 litres of liquid ammonia in the absence of moisture, while stirring and passing through a stream of nitrogen. The dark blue solution is cooled to —50° and a solution of 70 g. (0.267 mol) of 4,4a,4b,5,6,7,8,8a,9,10-decahydro-7-hydroxy-4b,8,8-trimethyl - 2(3H) - phenanthrone in 1.6 litres of absolute tetrahydrofuran is then immediately allowed to flow rapidly to the solution. After stirring at —50° for 3 hours 120 g. of ammonium chloride are adfded and the ammonia is distilled off overnight from the colourless reaction mixture. The resulting residue is concentrated in a vacuum and extracted with methylene chloride. The organic phases are washed with water, dried and concentrated by evaporation in a vacuum.

The remaining dark brown viscous oil is dissolved in 550 cc. of glacial acetic acid, 265 cc. of a 10% solution of chromium trioxide in 90% acetic acid are slowly added while cooling with ice and the mixture is allowed to stand at room temperature overnight. After the addition of a small amount of ethanol the mixture is concentrated in a vacuum, he residue is taken up in ether, the ether solution is washed with a saturated aqueous sodium bicarbonate solution, is dried and concentrated. The residue is crystallized from acetone whereby colourless prisms, having a melting point of 130 to 132°, are obtained.

A further amount of the compound may be obtained from the mother liquor by chromatography on silica gel and elution with a mixture of petroleum ether-ether (7:3).

UV-spectrum: maximum at 286 mm. (log ε=1.64).
IR-spectrum: inter alia bands at 1710 cm.$^{-1}$.
NMR-spectrum: inter alia signals at 1.03; 1.07; 1.11 p.p.m., singlets for C—CH$_3$(9H).

(b) 2,2 - ethylenedioxy-4b,8,8-trimethyl-perhydro-phenanthrone-(7).—13.1 g. of 4b,8,8-perhydro-phenanthrene-2,7-dione are dissolved in 60 cc. of absolute toluene, whereupon 3.6 cc. of ethylene glycol and 250 mg. of p-toluene sulphonic acid are added to the solution, this is boiled under reflux and the resulting water is distilled off azeotropically. After 1½ hours the reaction mixture is cooled, diluted with benzene, washed with sodium bicarbonate solution and water and concentrated by evapororation. After recrystallizing the residue from acetone-ether the compound has a melting point of 159 to 161°. A further amount of compound is obtained from the residue of the concentrated mother liquor by chromatography on silica gel, using petroleum ether with 15% of ether as eluant.

The IR-spectrum (in chloroform) inter alia shows the characteristic bands for the keto group at 1708 cm.$^{-1}$ and the NMR-spectrum singlets of 1.03 (3H) and 1.07 (6H) p.p.m. for the methyl groups as well as a singlet (4H) of 3.95 p.p.m. for the —O—CH$_2$—CH$_2$—O group.

(c) 2,2 - ethylenedioxy-4b,8,8-trimethyl-perhydro-phenanthrone-(7)-oxim.—2.78 g. of hydroxylamine hydrochloride and 8.20 g. of sodium acetate are heated for a short period in 50 cc. of ethanol and a suspension of 6.12 g. of 2,2 - ethylenedioxy - 4b,8,8-trimethyl-perhydro-phenanthrone-(7) in ethanol is then added. The mixture is boiled under reflux for 1 hour, is then strongly concentrated, the residue is taken up in methylene chloride and is washed with sodium bicarbonate solution and water. After drying and concentrating the methylene chloride solution by evaporation the residue is recrystallized from acetone-ether, whereby colourless crystals are obtained, for which two melting points have been observed: (1) 172 to 174° (sublimation), (2) 191 to 193°. The two compounds are identical in accordance with the thin layer chromatogramme and the UV- IR- and NMR-spectra.

The IR-spectrum inter alia shows characteristic bands at 3580 and 3250 cm.$^{-1}$, the NMR-spectrum singlets of 0.98; 1.08 and 1.15 p.p.m. (3H each) for the three methyl groups and a singlet (3.93 p.p.m., 4H) for the

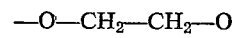

—O—CH$_2$—CH$_2$—O group.

(d) 7 - amino - 2,2 - ethylenedioxy-4b,8,8-trimethyl-perhydro-phenanthrene and 7-formamido-2,2-ethylenedioxy-4b,8,8-trimethyl-perhydro-phenanthrene.—14.4 g. of lithium in the form of small wire pieces are added to 800 cc. of liquid ammonia which has been cooled to —70° in a carbon dioxide-acetone cooling bath and 200 cc. of anhydrous and peroxide-free tetrahydrofuran are slowly added. A solution of 7.2 g. of 2,2-ethylenedioxy-4b,8,8-trimethyl-perhydro-phenanthrone-(7)-oxim in 200 cc. of tetrahydrofuran and 400 cc. of anhydrous isopropanol is then added dropwise during the course of 1 hour while stirring, whereupon stirring is continued for 1 hour and the cooling bath is then removed. After the initially dark blue solution has decolourized and the ammonia has evaporated, ice and water are added to the residue, the mixture is then concentrated to such an extent that only water is mainly present as solvent, shaking out is then effected with methylene chloride and the dried methylene chloride solution is concentrated by evaporation. Chromatography of the residue on aluminium oxide with benzene containing methanol in amounts increasing from 0.1 to 0.5%, as eluant, first yields a small amount of unconverted oxim and subsequently the amine in the form of an oil. This oil is subjected to formylation by dissolving it in 90 cc. of pyridine and adding with cooling a mixture obtained by heating 5.5 cc. of pure formic acid with 5.0 cc. of acetic anhydride at 50° for 2 hours. The pyridine solution is allowed to stand for several hours at room temperature, is subsequently strongly concentrated in a vacuum and a manifold quantity of water is then slowly added while cooling. The resulting product is shaken out with methylene chloride, the residue obtained by concentrating the methylene chloride solution by evaporation is dried in a vacuum and is recrystallized from isopropanol. The compound has a melting point of 206.5 to 208.5°, after recrystallizing again: 208 to 209°. IR-spectrum: inter alia bands at 3320 and 1660 cm.$^{-1}$ for the amide structure; NMR-spectrum: inter alia singlet (3.93 p.p.m., 4 H) for the —O—CH$_2$—CH$_2$—O grouping, partially covering the signal for the H-atom at C-3; wide, flat signal for the H-atom at the nitrogen atom of the amide group from 5.50 to 5.84 p.p.m.

(e) 7 - formamido - 4b,8,8 - trimethyl-1,4,4a,4b,5,6,7,8,8a,9,10,10a-dodecahydro-2(3H)-phenanthrone.—4.16 g. of 7 - formamido - 2,2 - ethylenedioxy - 4b,8,8-trimethylperhydro-phenanthrene are dissolved in 150 cc. of ethanol and 30 cc. of 2 N hydrochloric acid are added. After allowing the mixture to stand at room temperature for 50 minutes 150 cc. of water are added, most of the ethanol is evaporated, the mixture is made alkaline with ammonia and the product is shaken out with methylene chloride. The residue of the evaporated methylene chloride solution has a melting point of 153 to 155° after recrystallizing from benzene-hexane (4:1).

(3) 3-amino-14-desmethyl-cassenic acid β-dimethylamino-ethyl ester and 3-amino-14-desmethyl-isocassenic acid β-dimethylamino-ethyl ester.

(a) Racemic 3-formamido-14-desmethyl-cassenic acid ethyl ester and racemic 3-formamido-14-desmethyl-isocassenic acid ethyl ester (mixture seqtrans and seqcis).—A solution of 10.92 g. of diethyl-phosphonoacetic acid ethyl ester in 30 cc. of absolute dimethoxy-ethane is added dropwise to a stirred suspension of 2.16 g. of the mixture of 50% pulverized sodium hydride in mineral oil in 90 cc. of dimethoxyethane and stirring is subsequently continued for 45 minutes, whereby the hydride dissolves except for an insignificant turbidity. A suspension of 8.74 g. of 7-formamido-4b,8,8-trimethyl-1,4,4a,4b,5,6,7,8,8a,9, 10,10a-dodecahydro-2(3H)-phenanthrone in 60 cc. of dimethoxyethane is added to the thus prepared reagent and the mixture is further stirred at room temperature for 1½ hours in the absence of moisture, whereby the ketone rapidly dissolves. The reaction mixture is subsequently poured into 2 litres of ice water, the resulting precipitate is filtered off with suction and after thoroughly washing out with water is dried under calcium chloride first on the usual vacuum and then in a high vacuum. The production is then purified by chromatography (2 kg. of aluminium oxide, partially deactivated with 10% of water; eluant: benzene with 0.2% of methanol in fractions of 1 litre). Fractions 9 to 18 yield a mixture of racemic 3-formamido-14-desmethyl-isocassenic acid ethyl ester and racemic 3-formamido-14-desmethyl-cassenic acid ethyl ester, which has a melting point of 153 to 156° after recrystallization from 160 cc. of benzene-hexane (1:3). The following fractions contain small amounts of a by-product. IR-spectrum: inter alia bands at 1710 cm.$^{-1}$ for $\alpha,\beta$-unsaturated ester. NMR-spectrum: inter alia signal at about 3.7 p.p.m. for an equatorial H in α-position to the semicyclic double bond; quadruplet at 3.97, 4.09, 4.20 and 4.33 p.p.m. with peaks for both methylene protons of the carbethoxy group; the three named signals are partially covered by the wide, flat signal for the axial H at C-3. Furthermore: The superposed singlets for the proton on the double bond in the α-position to the carbethoxy group and the N-H of the formamido group at 5.58 p.p.m., as well as the signal bound at C of the last named group at 8.22 p.p.m.

(b) Racemic 3-amino-14-desmethyl-cassenic acid ethyl ester and racemic 3-amino-14-desmethyl-isocassenic acid ethyl ester (mixture seqtrans+seqcis).—A mixture of 4.71 g. of racemic 3-formamido-14-desmethyl-cassenic acid ethyl ester and racemic 3-formamido-14-desmethyl-isocassenic acid ethyl ester in 60 cc. of isopropanol is boiled under reflux for 7 hours after the addition of 6 cc. of concentrated hydrochloric acid, 200 cc. of water are subsequently added whereupon the alcohol is distilled off, the aqueous solution is made alkaline with ammonia and the liberated base is extracted with methylene chloride. After evaporating the methylene chloride solution the base is obtained as an oil which cannot be crystallized and is converted into the neutral oxalate, by dissolving the oil in 30 cc. of alcohol, adding the calculated amount of oxalic acid dissolved in alcohol, allowing the immediately resulting precipitate to stand in the cold and then filtering with suction and drying. The resulting mixture of the oxalate of racemic 3-amino-14-desmethyl-cassenic acid-ethyl ester and racemic 3-amino-14-desmethyl-isocassenic acid-ethyl ester has a melting point of 246 to 247°. After recrystallizing a sample from a large amount of 90% alcohol the melting point is 247 to 248° (decomp.). The methane sulphonate which is also produced has a melting point of 248 to 249° with decomposition.

IR-spectrum (methane sulphonate): inter alia bands at 1702 cm.$^{-1}$ for $\alpha,\beta$-unsaturated ester.

NMR-spectrum (methane sulphonate): triplet for the 3 protons of the terminal methyl group of the carbethoxy group at 1.12, 1.24 and 1.37 p.p.m.; quadruplet for the 2 protons of the methylene group of the carbethoxy group at 3.95, 4.06, 4.18 and 4.31 p.p.m.; singlet for the proton at the double bond in α-position to a carbethoxy group at 5.63 p.p.m.; wide signal (singlet) from 7.22 to about 7.75 p.p.m. for the 3 protons of the $NH_3^+$-group.

(c) Mixture of racemic 3-amino-14-desmethyl-cassenic acid β-dimethylamino-ethyl ester and racemic 3-amino-14-desmethyl-isocassenic acid β-dimethylamino-ethyl ester; separation into the seqtrans and seqcis form.—The bases are liberated from 3 g. of the mixture of the oxalate of racemic 3-amino-14-desmethyl-cassenic acid-ethyl ester and racemic 3-amino-14-desmethyl-isocassenic acid-ethyl ester (seqtrans and seqcis), are taken up in 70 cc. of dimethylamino-ethanol, the mixture is stirred after the addition of 140 mg. of pulverized potassium hydroxide until the latter is dissolved and is subsequently allowed to stand at room temperature in an atmosphere of nitrogen for 3 days. The solution is diluted with water, the potassium hydroxide is neutralized by the addition of 40 cc. of an m/4 potassiumdihydrogenphosphate solution and all the material is concentrated by evaporation, the residue is dried in a vacuum and is again dissolved in water, the solution is made alkaline with ammonia and is shaken out with methylene chloride whereby the mixture of bases is isolated. The residue of the evaporated methylene chloride solution shows the presence of unconverted starting material, two new bases and traces of further products in the thin layer chromatogramme (silica gel plates, chloroform with 2% of methanol as eluant, atmosphere of $NH_3$).

Chromatography of the mixture of bases: 800 g. of aluminium oxide partially deactivated with 12% of water; mobile liquid: 16 litres of benzene with 0.2% of methanol, followed by 15.2 litres of benzene with 0.5% of methanol; fractions of 400 cc. each, the evaporation residues of which are examined by thin layer chromatography in accordance with the method indicated above.

Fractions 11 to 18 contain starting material (RF=0.65).

Fractions 19 to 20 contain a mixture of starting material with racemic 3-amino-14-desmethyl-isocassenic acid-β-dimethyl-amino-ethyl ester (RF=0.53).

Fractions 21 to 26 contain racemic 3-amino-14-desmethyl-isocassenic acid-β-dimethylamino-ethyl ester (RF as above).

Fractions 27 to 35 contain a mixture of racemic 3-amino-14-desmethyl-isocassenic acid-β - dimethylamino-ethyl ester and racemic 3-amino-14-desmethyl-cassenic acid-β-dimethylamino-ethyl ester (RF=0.46).

Fractions 36 to 73 contain racemic 3-amino-14-desmethyl-cassenic acid-β-dimethylamino-ethyl ester (RF as above).

The mixed fractions are chromatographed again in analogous manner whereby a further amount of the racemic base 3-amino-14-desmethyl-isocassenic acid-β-dimethylamino-ethyl ester (seqcis form) and a further amount of the racemic base 3-amino-14-desmethyl-cassenic acid-β-dimethylamino-ethyl ester (seqtrans form) are obtained. Both are oils which cannot be crystallized and are converted into their dimethane sulphonates for purposes of characterization.

DIMETHANE SULPHONATE OF THE SEQCIS BASE 890 mg. of racemic 3-amino-14-desmethyl-isocassenic acid-β-dimethylamino-ethyl ester (seqcis-base) are dissolved in a small amount of isopropanol, the calculated amount of methane sulphonic acid in isopropanol is added and the solution is concentrated to 12 cc., whereupon 872 mg. of dimethane sulphonate, having a melting point of 246.5 to 248°, precipitate in the cold (277 mg. of base are recovered from the mother liquor).

IR-spectrum: inter alia bands at 1720 cm.⁻¹ for α,β-unsaturated ester. NMR-spectrum (of the base liberated from the salt): inter alia singlet for the $NH_2$-protons at 1.38 p.p.m.; singlet for the 6 protons of the dimethylamino group at 2.28 p.p.m., triplets for the protons of the methylene group in the α-position to the nitrogen atom of the side chain with peaks at 2.45, 2.56 and 2.66 p.p.m.; doublet with peaks at 3.68 and 3.84 p.p.m. for 1 proton in ring C in the α-position to the semicyclic double bond; triplet with individual signals at 4.07, 4.16 and 4.26 p.p.m. for the two protons of the methylene group in the β-position to the N of the dimethylamino group; singlet for the proton at the double bond in the α-position to the carbethoxy group at 5.60 p.p.m.

DIMETHANE SULPHONATE OF THE SEQTRANS-BASE

This salt is more readily soluble in isopropanol than that of the isomeric compound. 980 mg. of racemic 3-amino-14 - desmethyl-cassenic acid-β-dimethylamino-ethyl ester (seqtrans-base) are dissolved in some isopropanol and the calculated amount of methane sulphonic acid in isopropanol is added. After concentrating the solution to 12 cc., 20 cc. of dioxane are carefully added portionwise, whereupon the mixture is placed in the cold and 951 mg. of dimethane sulphonate, having a melting point of 219 to 221° (after softening from 170°) are filtered with suction. After drying for a long period in the high vacuum the dimethane sulphonate still contains 1 mol of water. IR-spectrum: inter alia bands at 1713 cm.⁻¹ for α,β-unsaturated ester. NMR-spectrum (of the base liberated from the salt): practically identical with that of the preceding seqcis compound, except that the two individual signals of the doublet for the proton in ring C in the α-position to the semicyclic double bond are shifted to 3.75 and 3.96 p.p.m.

(d) Separation of racemic 3-amino-14-desmethyl-cassenic acid β-dimethylamino-ethyl ester dihydrochloride or dihydrobromide (seqtrans form) from a mixture of racemic 3-amino-14-desmethyl-cassenic acid β-dimethylamino-ethyl ester and racemic 3-amino-14-desmethyl-isocassenic acid β-dimethylamino-ethyl ester.—(1) dihydrochloride—4.07 g. of a mixture of bases obtained by the exchange of ester radicals of a mixture of racemic 3-amino-14-desmethyl-cassenic acid-ethyl ester and racemic 3-amino-14-desmethyl-isocassenic acid-ethyl ester with β-dimethyl-amino-ethanol, are dissolved in 150 cc. of isopropanol and 2.3 cc. of concentrated (at least 10 N) hydrochloric acid are added. After allowing the solution to stand at +5° for at least 3 days the precipitated salt is filtered off and dried: 1.47 g., melting point 283 to 286°. In accordance with the thin layer chromatogramme (silica gel plates, chloroform+0.5% of methanol, atmosphere of ammonia) the salt contains at most 10% of the isomeric isocassenic acid derivative and no starting material, i.e. none of the corresponding ethyl esters. After dissolving in 6 cc. of water, adding 75 cc. of isopropanol, and allowing to stand for several days at −15° racemic 3-amino-14-desmethyl-cassenic acid - β - dimethylamino-ethyl ester dihydrochloride, which is uniform in accordance with thin layer chromatography, crystallizes. Melting point 294.5 to 296.5° (decomp.).

(2) Dihydrobromide.—4.07 g. of a mixture of bases, obtained as indicated in section (1) above are dissolved in 150 cc. of isopropanol and 3 cc. of a 48% hydrobromic acid are added. After proceeding in accordance with step (1) above 1.56 g. of dihydrobromide, having a melting point of 278 to 280°, are obtained. The salt contains at most 10% of the isomeric isocassenic acid derivative and no starting material, i.e. none of the corresponding ethyl esters, in accordance with the thin layer chromatogramme (process as described in section (1) above). After dissolving the salt in 6.5 cc. of water, adding 85 cc. of isopropanol and allowing to stand at −15° uniform racemic 3-amino-14-desmethyl-cassenic acid-β-dimethylamino-ethyl ester dihydrobromide, having a melting point of 288 to 289° (decomp.), crystallizes.

(4) Production of the mixed anhydrides (a) Hydrochloride of the mixed anhydride from N-piperidino-acetic acid and benzoic acid.—5 g. of pulverized and dried N-piperidino-acetic acid are suspended in 80 cc. of acetonitrile, whereupon the suspension is cooled in ice water and 5.8 g. of benzoyl chloride are added. The mixture is further cooled and shaken whereby N-piperidino-acetic acid dissolves except for a small portion and the precipitation of the product commences. This precipitation is completed by further shaking, first at about 0° for 10 minutes, then at room temperature for 30 minutes. The anhydride hydrochloride which has been filtered with suction may be used for the reaction described in Examples 1 and 2 without further purification.

(b) Hydrochloride of the mixed anhydride from β-N-piperidino-propionic acid and benzoic acid.—3.14 g. of β-N-piperidino-propionic acid are dissolved while heating in 50 cc. of acetonitrile, whereupon the solution is cooled to such a degree that the acid again commences to precipitate. 3.30 g. of benzoyl chloride are then added and the mixture, from which a precipitate immediately commences to separate, is shaken at room temperature for 40 minutes. The subsequently separated anhydride hydrochloride may be used for the reactions described in Examples 3 and 4 without further purification.

What is claimed is:
1. A compound of formula:

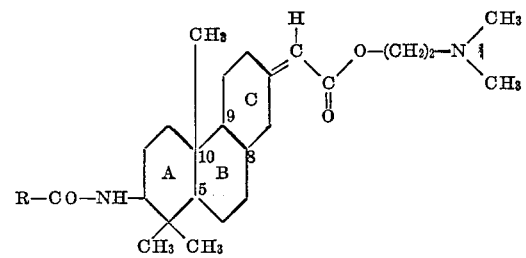

or a compound of formula:

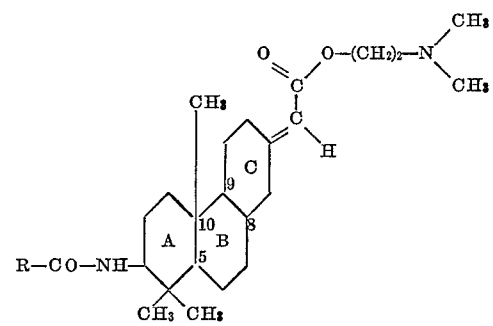

in which formulae R is piperidino-methyl, piperidino-ethyl or D-glucopentahydroxy-pentyl, or a pharmaceutically acceptable acid addition salt thereof.

2. A compound according to claim 1, which is 3-(N-piperidino-acetylamino)-14-desmethyl-cassenic acid β-dimethylamino-ethyl ester.

3. A compound according to claim 1, which is 3-(N-piperidino-acetylamino)-14-desmethyl-isocassenic acid β-dimethylamino-ethyl ester.

4. A compound according to claim 1, which is 3-(β-N-piperidino-propionylamino-14-desmethyl-cassenic acid β-dimethylamino-ethyl ester.

5. A compound according to claim 1, which is 3-(β-N-piperidino-propionylamino)-14-desmethyl-isocassenic acid β-dimethylamino-ethyl ester.

6. A compound according to claim 1, which is 3-D-gluconylamino - 14 - desmethyl - cassenic acid β-dimethylamino-ethyl ester.

7. A compound according to claim 1, which is 3-D-gluconylamino - 14 - desmethyl - isocassenic acid β-dimethylamino-ethyl ester.

8. 3 - amino - 14 - desmethyl - cassenic acid β-dimethylamino-ethyl ester.

9. 3 - amino - 14 - desmethyl - isocassenic acid β-dimethylamino-ethyl ester.

10. 7 - formamido - 4b,8,8 - trimethyl - 1,4,4a,4b,5,6,7,8,8a,9,10,10a-dodecahydro-2(3H)-phenanthrone.

References Cited
FOREIGN PATENTS 1,475,540  3/1967  France.

HENRY R. JILES, Primary Examiner

G. T. TODD, Assistant Examiner

U.S. Cl. X.R.

260—340.9, 468.5, 561, 563, 586, 590, 566, 567.6, 571; 267, 305